(12) United States Patent
Alts et al.

(10) Patent No.: US 6,454,048 B1
(45) Date of Patent: Sep. 24, 2002

(54) ACOUSTIC INSULATING VEHICLE COMPONENT

(75) Inventors: Thorsten Alts, Gross-Bieberau; Ralf Peter Marsch, Rossdorf; Marzell Erdkamp, Modautal; Edmund Bonna, Triesen, all of (DE)

(73) Assignee: Rieter Automotive (International) AG, Zollikon (CH)

( * ) Notice: Subject to any disclaimer, the term of this patent is extended or adjusted under 35 U.S.C. 154(b) by 0 days.

(21) Appl. No.: 09/647,246

(22) PCT Filed: May 12, 1999

(86) PCT No.: PCT/CH99/00202
§ 371 (c)(1),
(2), (4) Date: Sep. 28, 2000

(87) PCT Pub. No.: WO99/58371
PCT Pub. Date: Nov. 18, 1999

(30) Foreign Application Priority Data

May 12, 1998 (CH) .............................................. 1050/98

(51) Int. Cl.$^7$ .............................. E04B 1/82; E04B 2/02
(52) U.S. Cl. ...................................... 181/290; 181/286
(58) Field of Search .................................. 181/290, 286, 181/294, 292, 210, 211, 205

(56) References Cited

U.S. PATENT DOCUMENTS

| | | | | |
|---|---|---|---|---|
| 4,099,590 A | | 7/1978 | Martin, Sr. .................. 180/69 |
| 4,966,799 A | * | 10/1990 | Lucca et al. ................ 181/290 |
| 5,196,253 A | * | 3/1993 | Mueller et al. ............. 181/211 |
| 5,245,141 A | * | 9/1993 | Fortez et al. ............... 181/288 |
| 5,266,374 A | * | 11/1993 | Ogata .......................... 181/284 |
| 5,464,952 A | | 11/1995 | Shah et al. .................. 181/211 |
| 5,483,028 A | | 1/1996 | Holwerda ................... 181/207 |
| 5,536,556 A | * | 7/1996 | Juriga ......................... 181/284 |
| 5,554,831 A | * | 9/1996 | Matsukawa et al. ........ 181/286 |
| 5,681,072 A | | 10/1997 | Stricker ..................... 296/39.3 |
| 5,741,390 A | * | 4/1998 | Schmuck et al. ........... 181/290 |
| 6,024,190 A | * | 2/2000 | Ritzema ..................... 181/286 |
| 6,102,465 A | * | 8/2000 | Nemoto et al. ............. 181/286 |
| 6,145,617 A | * | 11/2000 | Alts ............................ 181/286 |

FOREIGN PATENT DOCUMENTS

| | | |
|---|---|---|
| DE | 3800740 A1 | 8/1989 |
| EP | 0 636 517 A1 | 2/1995 |
| EP | 0 680 866 A1 | 11/1995 |
| GB | 2 216 081 A | 10/1989 |
| WO | 98/18657 | 5/1998 |

\* cited by examiner

*Primary Examiner*—Robert E. Nappi
*Assistant Examiner*—Edgardo SanMartin
(74) *Attorney, Agent, or Firm*—Nath & Associates PLLC; Gary M. Nath; Marvin C. Berkowitz

(57) ABSTRACT

A vehicle component has a vehicle body part in combination with an acoustic insulating structure which interacts therewith. The acoustic insulating structure has an outer covering having a shield. The shield is spaced at a distance from the vehicle body part by an intermediate layer. In a particular embodiment, the intermediate layer is at least partially filed with a foam layer which is pressed against the body part by the shield. The shield is preferably perforated and the foam layer is protected against humidity and moisture by a thin plastic film. The outer covering can be conventionally fastened to the underside of the body part.

20 Claims, 2 Drawing Sheets

ACOUSTIC INSULATING VEHICLE COMPONENT

FIELD OF THE INVENTION

The present invention concerns a vehicle component according to the preamble of claim 1 and an external cover for this.

DESCRIPTION OF THE RELATED ART

It is known to equip the floor panel of a vehicle with an acoustically active i.e. sound-insulating and/or sound-absorbing interior lining. Usually such a lining has a sound-insulating damping layer which is laid or glued directly onto the floor plate. In vehicles of higher comfort, on this vibration-damping and sound-insulating layer is applied a further sound-absorbing foam or fibre fleece layer and a heavy airtight carpet layer. These additional layers are matched to each other acoustically so that they can interact with each other as an acoustic spring-mass system. It is also known to apply a protective coating to the outside of the floor panel. This protective coating protects the floor panel mechanically and/or chemically for example against stone chips or road salt. Naturally this protective coating, referred to below as the underfloor coating, also contributes to additional damping of the vibrations of the floor panel.

As underfloor protect-on usually a relatively expensive PVC coating of approximately 1 mm thickness is sprayed on. Such a layer leads to a weight increase of around 1–1.5 kg/m$^2$ and undesirably releases large quantities of chlorine on recycling.

SUMMARY OF THE INVENTION

It has been found that the multiplicity of layers and coatings of different functions applied to the floor plate undesirably increase the total weight of the vehicle and undesirably reduce the passenger space, in particular the foot space. The general aim of the modern vehicle industry however is to make vehicles lighter, more spacious and more economic.

It is therefore the task of the present invention to create a vehicle component which allows the foot space of the vehicle to be structured more spaciously without loss of acoustic effectiveness.

In addition a vehicle component is created which in comparison with conventional vehicle floor configurations is lighter and more cost effective and in particular raises no special disposal problems.

This task is solved according to the invention with the vehicle component according to claim 1 and an outer covering according to claim 13, and in particular in that on the outside of the body part is applied a strengthening shield at a distance from the said part which together with the body part forms a double floor structure. This double floor structure has a sound-insulating effect and can be combined with further sound-insulating and/or sound-absorbing elements.

In a preferred development of the vehicle component according to the invention a foam layer, in particular a soft foam, is introduced in the cavity of the double floor where the foam, preferably on its side facing the body part, is fitted with a profile. Such profiled dissipatively acting layers are known for example from EP 0 474 593 (which is hereby included in full scope as a constituent of this application) and rest loosely against the body part and damp the body vibrations. For this the soft foam and double floor are dimensioned such that the profiled soft foam is pressed against the body part by the shield of the double floor.

In a further preferred design of the vehicle component according to the invention the double floor is combined with an ultralight absorption package of the known type (for example according to WO98/18657, the content of which forms part of this application). Instead of a heavy layer this has a microporous stiffening layer. In this embodiment both the sound-insulating bituminous damping layer inside the vehicle and the heavy layer of the spring-mass system of the interior lining can be omitted.

This creates an acoustically active vehicle component which is considerably lighter than conventional systems and in the interior of the vehicle has a lower thickness. It is evident that by suitable combination of the double floor according to the invention with sound-insulating and/or sound-absorbing systems, of the known type, the acoustic efficacy can be improved further.

Preferred developments are defined by the features of the sub-claims.

The invention is now explained in more detail below with reference to design examples and the figures. Here:

DETAILED DESCRIPTION

Figure 1:
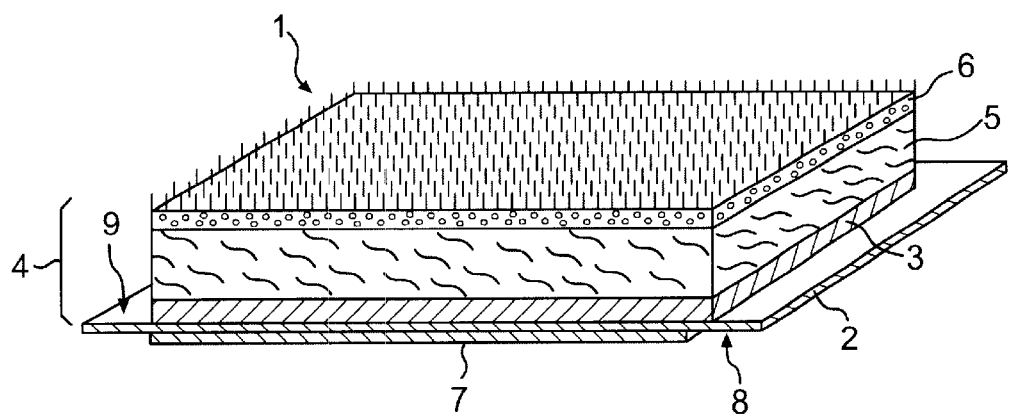
FIG. 1 shows a diagrammatic view of a conventional vehicle floor.

The vehicle floor 1 shown in FIG. 1 has a conventional structure. On the inside of the floor plate 2, for example a steel plate approximately 0.8 mm thick, is applied a bituminous damping layer 3. This damping layer 3 usually weighs around 2.3 kg/m$^2$ and is glued in place. On this damping layer 3, depending on vehicle equipment level, is applied a more or less heavy sound-absorbing spring-mass system 4, the spring layer 5 of which consists of a fibre fleece approximately 20 mm thick, an open-pore foam or a foam flock fleece (KFF), the mass layer 6 of which consists of a heavy layer (EPDM) weighing approximately 3.2 kg/m$^2$ or a corresponding decor or carpet layer. On the outside 8 the floor plate 2 has an underfloor coating 7 approximately 1 mm thick which usually consists of sprayed on PVC. The total weight of the acoustically active structure applied to such a vehicle floor 1 is therefore at least 8.0 kg/m$^2$.

Figure 2:
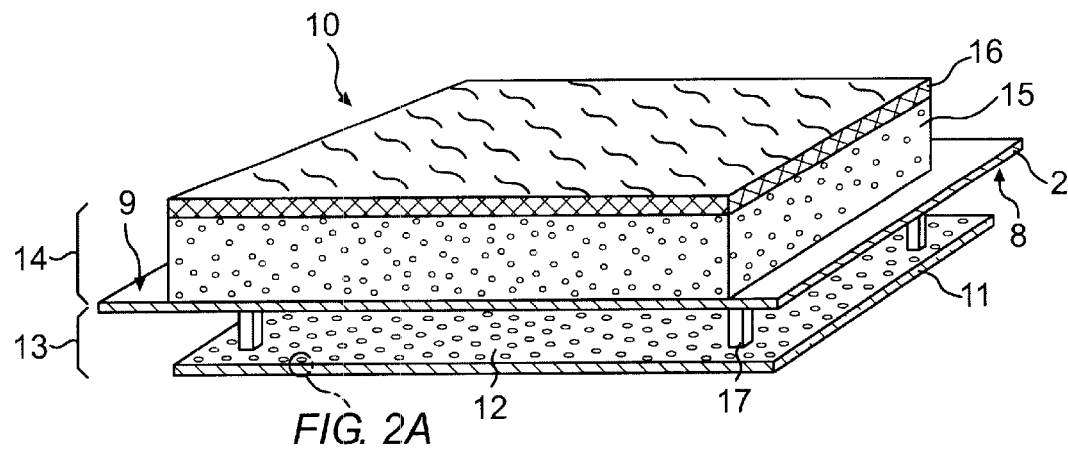
FIG. 2 shows a diagrammatic view of the vehicle component according to the invention.
Figure 2A:
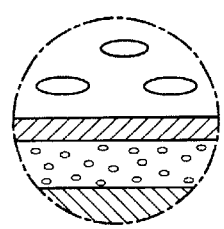
FIG. 2a shows an enlarged view of a portion of the vehicle component of FIG. 2.

In contrast FIG. 2 shows a vehicle component 10 equipped according to the invention. In its simplest embodiment this has a shield 11 at a distance from the outside 8 of the floor plate 2 and together with the floor plate 2 forms a double floor 13. The cavity between the floor plate 2 and the shield 11 in this simple embodiment has a thickness of a few millimetres, in particular 5 to 15 mm, and is filled only with air. In a preferred embodiment this cavity is filled with a sound-insulating and/or sound-absorbing intermediate layer 12. Suitable materials for this intermediate layer are open-pored and known to the expert for some time. In order to clamp the shield 11 to the body part 2, suitable means 17 are provided. These means can comprise any conventional connection technology known today for example bolting, clipping etc. and in particular can use the weld bolts normally used in vehicles. The body part 2 consists of a conventional body panel for example made of a 0.8 mm thick steel plate whereas the shield 11, in a preferred embodiment, consists of a fibre-and/or filler-reinforced plastic 0.5 mm to 3.0 mm thick, preferably 1.0 mm to 2.4 mm thick, with a basis weight of around 3 kg/M$^2$.

The double floor arrangement according to the invention, because of the spring effect of the air, leads to improved sound insulation outside the sandwich resonance of the spring-mass structure.

Suitable materials for structuring the shield 11 according to the invention are shown in the table below:

|  | Fibre Filler in w. % | Fibre Type | Matrix | Group | Density | E-modulus of bending in GPa |
|---|---|---|---|---|---|---|
| GMT | 20 | Glass | PP | Thermoplastic | 1.03 | 2.9 |
| LFT | 20 | Glass | PP | Thermoplastic | 1.03 | 2.9 |
| LFI | 20–25 | Glass | PUR | Thermoset | 0.5–1.15 | 2.0–5.5 |
| NMT | 30 | Green flax | PP | Thermoset | 1.02–1.03 | 3.5 |
| R-RIM | 20 | Glass | PUR | Thermoset | 1.2 | 1.2 |
| Injection moulding | 20 | Glass | PP | Thermoplastic | 1.04 | 3.8 |
| SMC | 25 | Glass | UP resin | Thermoset | 1.7–2.0 | 8.5–14 |

The particularly advantageous feature of these materials is their high rigidity and low density. Further density reductions can be achieved via other additional fillers e.g. by means of hollow glass balls with a particle size of 10 to 200 μm and an effective density of 0.14 to 0.70 g/cm$^3$. Suitable fibre fillers are aramite, carbon, hybrid, textile, glass, natural, polyamide, polyester or mineral fibres.

In a preferred embodiment the shield 11 has perforations i.e. at least a partial hole structure. These perforations can have a diameter of 0.5 mm to 3 mm, preferably 1.0 mm, and are for example arranged at intervals of approximately 2.5 mm from each other. In order to protect the open-pore intermediate layer 12 from moisture and humidity, advantageously at least between shield 11 and intermediate layer 12 is applied a thin plastic film. On the outside of shield 12 can be applied an open-pore fibre or carpet layer to achieve additional protection against stone chips and/or water. Such a fibre and/or carpet layer also improves the air flow behaviour on the outside of shield 11 (shark-skin principle). Such a double floor is particularly suitable for the outer covering of wheel arches. The acoustic efficacy of the double floor according to the invention is particularly useful in this application.

In a further development of the double floor arrangement according to the invention on the inside 9 of the body part 2 is provided a conventionally constructed sound-insulating spring-mass system 14. In this embodiment this comprises a sound-dissipating porous layer of reduced thickness acting as a spring (soft light foam, heavy foam or fibre fleece layer) and a slight heavy layer 6 acting as a mass. Or on the inside 9 of body part 2 is provided a sound-insulating and sound-absorbing spring-mass system 14 similar to the system described in WO98/18657, consisting of a porous layer 14 acting as a spring and a microporous cover layer 16 acting as a light mass.

In a further development of the double floor arrangement according to the invention, on the inside 9 of body part 2 is provided a conventionally constructed sound-absorbing spring-mass system 14. In this embodiment this comprises an absorber layer 15 (light foam layer) acting as a spring and a porous cover or heavy layer 16 acting as a mass layer. The double floor arrangement according to the invention thus allows the omission of the damper layer 3 and underfloor coating 7 conventionally applied. This allows the weight of the acoustically active structure to be reduced substantially. In particular, the sound-insulating damping layer 3 can be dispensed with the interior lining 14, and the protective coating 7 can be dispensed with the outer layer 13. This leads to a weight saving of more than 2 kg/m$^2$ without restricting the acoustic effect as corresponding comparison measurements confirm. At the same time the thickness of the interior structure 14 can be reduced.

Figure 3:
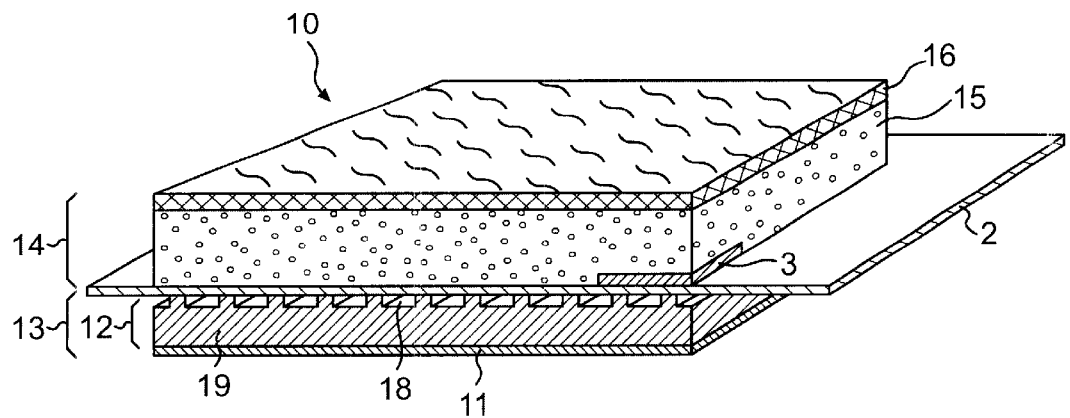
FIG. 3 is a diagrammatic view of a further development of a vehicle component according to the invention.

In a preferred development of the vehicle component according to the invention as shown in FIG. 3, the intermediate layer 12 consists of an elastic PU foam 19. This foam 19 has a profile which lies on the outside 8 of body part 2 and in particular is pressed by shield 11 onto this body part 2. This provokes a vibration damping of the body part 2. The profiling of this foam 19 leads to the formation of a labyrinth-like air layer 18 between the body part 2 and the foam layer 19, which air layer 18 also has a dissipative effect in interaction with the vibrating body part 2. Evidently this foam layer 19 can be used to make contact both over the full area and also partially. In a particular embodiment the cavity between the shield 11 and the body part 2 is filled only partially with an intermediate layer 12. In addition the inside 9 of the body part 2 can also be partially covered with a damping layer 3.

In further developments of the construction according to the invention, instead of a conventional spring-mass system 14 an ultralight absorption package is used. Such absorption packages are for example described in WO98/18657 and instead of a heavy layer 6, 16 have a microporous stiffening layer which has a total air flow resistance of 500 Nsm$^{-3}$ < $R_f$ < 2500 Nsm$^{-3}$ and a surface mass of 0.5 kg/m$^2$ < $m_F$ < 1.6 kg/m$^2$. The bending strength of such a microporous stiffening layer is 0.005 Nm < B < 10.5 Nm.

Figure 4:
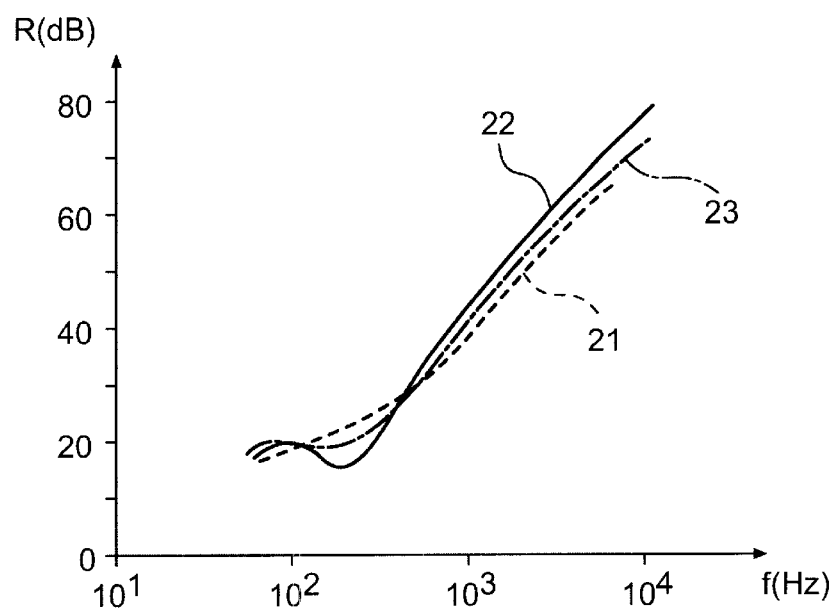
FIG. 4 is a diagram of the acoustic efficacy of the various vehicle components with different equipment.

The diagram in FIG. 4 shows the acoustic efficacy of the various vehicle components. Curve 22 shows the acoustic behaviour of a conventional structure according to FIG. 1.

The development of this curve 22 in the area of 200 Hz shows a characteristic insulation minimum and clearly shows that with this sound-damping structure the sound insulation efficacy runs essentially linear at higher frequencies and at approximately 10,000 Hz has a value of around 80 dB. This development corresponds rather precisely to the acoustic behaviour of the double floor according to the invention in combination with a classic spring-mass system. In contrast curve 21 shows the sound insulation behaviour of the sound-absorbing ultralight insulation system cited above (according to WO98/18657) on a conventional floor plate equipped with underfloor protection and damping coating. Here the sound insulation efficacy R has no resonance loss and shows an improvement in comparison with the configuration in curve 22 of up to 10 dB in the area of around 200 Hz. The insulation efficacy R of the configuration according to curve 21 rises above 500 Hz almost linear with the—logarithmic—frequency and with a slightly lesser gradient. The acoustic behaviour of a preferred design form according to the invention is indicated by curve 23. In this embodiment the double floor according to the inversion is combined with the ultralight insulation system according to WO95/18657.

The benefits of the vehicle component according to the invention are immediately evident to the expert. In particular with the vehicle component according to the invention the heavy vibration-damping layers are replaced by stiffening and sound-absorbing layers. The reduction in layer thickness in the area of this vehicle foot room achieved by the vehicle component according to the invention proves particularly advantageous. It is evident that by omission of the heavy vibration-damping layers, the arrangement according to the invention is more economic than conventional insulation systems. The external noise reduction in the wheel arches because of the improved sound insulation effect has proved particularly advantageous. At the same time the present arrangement gives improved corrosion protection and with this arrangement a lower CW value can be achieved if the double floor arrangement is fitted with a surface structure (carpet or golf ball structure) on the outside. Further developments of the double floor arrangement according to the invention and suitable combinations with other acoustically active systems of known types lie within the scope of the knowledge of a person skilled in the art and are not explained in more detail here. It is evident that the double floor arrangement according to the invention can be used not only on vehicle floors or in wheel arches but equally well for engine encapsulation.

What is claimed is:

1. Vehicle component comprising a body part in combination with an acoustically active structure, where the acoustically active structure has an outer cover which comprises a shield spaced from the body part by an intermediate layer, wherein the shield has a bending elasticity modulus of 1 to 15 Gpa and a density from 0.3 to 2.5 g/cm$^3$.

2. Vehicle component according to claim 1, wherein the shield comprises a beaded panel, a fibre-reinforced thermoplastic or a fibre-reinforced thermoset.

3. Vehicle component according to claim 2, wherein the intermediate layer comprises a foam layer which lies at least partially on the body part.

4. Vehicle component according to claim 3, wherein the foam layer has at least partially a surface structure which lies on the body part.

5. Vehicle component according to claim 1, wherein the shield is at least partially perforated.

6. Vehicle component according to claim 1, wherein between the shield and the intermediate layer is arranged a water-impermeable film.

7. Vehicle component according to claim 1, wherein the foam layer has a water-impermeable sleeve.

8. Vehicle component according to claim 1, wherein the body part has an acoustically active interior lining.

9. Vehicle component according to claim 8, wherein the interior lining has a spring-mass system.

10. Vehicle component according to claim 8, wherein the interior lining has an ultralight absorption/insulation structure with a microporous stiffening layer.

11. Vehicle component according to claim 1, wherein the body part is fitted on the inside at least partially with a damping layer.

12. An acoustically active structure comprising an outer cover with a shield and an intermediate layer, wherein the shield has a bending elasticity modulus of 1 to 15 GPa and a density from 0.3 to 2.5 g/cm$^3$.

13. Outer cover according to claim 12, wherein the shield comprises a beaded plate, a fibre-reinforced thermoplastic or a fibre-reinforced thermoset.

14. Outer cover according to claim 13, wherein the shield has on a side facing a body part a foam layer which can lie at least partially on-the body part.

15. Outer cover according to claim 14, wherein the foam layer has at least partially a surface structure which lies on the body part.

16. Outer cover according to claim 12, wherein the shield is at least partially perforated.

17. Outer cover according to claim 12, wherein between the shield and the foam layer is arranged a water-impermeable film.

18. Outer cover according to claim 12, wherein the foam layer has a water-impermeable sleeve.

19. Vehicle component according to claim 1 wherein said shield has a bending elasticity modulus of 1 to 6 Gpa.

20. Outer cover according to claim 12 wherein said shield has a bending elasticity modulus of 1 to 6 Gpa.

* * * * *